United States Patent
Heinzelmann

(10) Patent No.: US 7,360,458 B2
(45) Date of Patent: Apr. 22, 2008

(54) METHOD AND DEVICE FOR DETERMINING THE TORQUE ON GEAR SHAFTS

(75) Inventor: Karl-Fritz Heinzelmann, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 193 days.

(21) Appl. No.: 10/574,726

(22) PCT Filed: Sep. 15, 2004

(86) PCT No.: PCT/EP2004/010295

§ 371 (c)(1),
(2), (4) Date: Apr. 6, 2006

(87) PCT Pub. No.: WO2005/038421

PCT Pub. Date: Apr. 28, 2005

(65) Prior Publication Data

US 2006/0225520 A1    Oct. 12, 2006

(30) Foreign Application Priority Data

Oct. 13, 2003  (DE) ............................... 103 47 494

(51) Int. Cl.
*G01L 3/02* (2006.01)
(52) U.S. Cl. .................................. 73/862.326; 701/61
(58) Field of Classification Search ............. 73/862.08, 73/862.324, 862.325, 862.326; 701/61; 324/207.11
See application file for complete search history.

(56) References Cited

U.S. PATENT DOCUMENTS

| | | | |
|---|---|---|---|
| 5,154,268 A | 10/1992 | Heuer | |
| 5,398,555 A | 3/1995 | Ueno et al. | |
| 5,452,207 A | 9/1995 | Hrovat et al. | |
| 5,509,867 A * | 4/1996 | Genise | ........................ 477/120 |
| 5,729,454 A | 3/1998 | Amsallen | |
| 5,999,873 A | 12/1999 | Minowa et al. | |

FOREIGN PATENT DOCUMENTS

| | | |
|---|---|---|
| DE | 197 57 007 A1 | 8/1998 |
| DE | 101 46 252 A1 | 4/2003 |
| JP | 2003/42251 | 2/2003 |
| WO | WO-02/47934 A1 | 6/2002 |

* cited by examiner

*Primary Examiner*—Edward Lefkowitz
*Assistant Examiner*—Punam Patel
(74) *Attorney, Agent, or Firm*—Davis Bujold & Daniels, P.L.L.C.

(57) ABSTRACT

A method and a device for determining the torques on gear shafts. With the help of this method and the device in the case of a constant transmission ratio, the rotational speed of a first gear shaft (2, 19) and the rotational speed of a second gear shaft (3, 22) are measured cyclically. A first torque is present on the first gear shaft and a second torque is present at the second gear shaft. The second gear shaft is driven by the first gear shaft directly or indirectly, via gears (5, 6, 7, 8; 20, 21). A quotient is computed from these two rotational speeds, and stored so the current quotient can be compared with the quotient of the previous measuring cycle. In the case of a difference in the quotients of the current and the previous measurement, a change in the torque of the first gear shaft can be assumed.

8 Claims, 2 Drawing Sheets

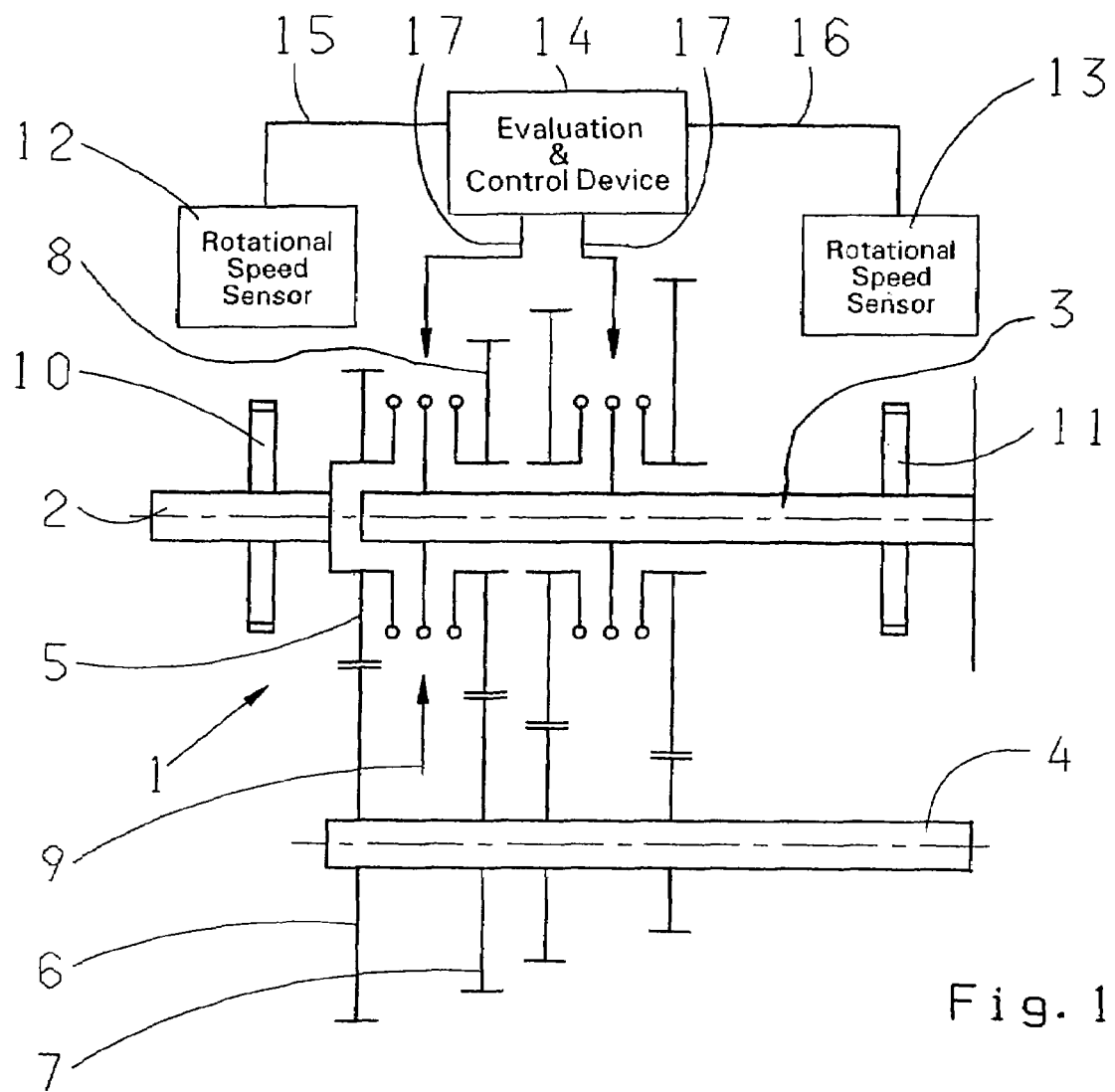
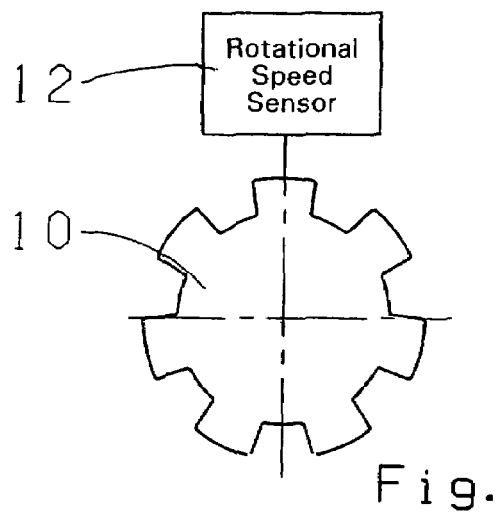
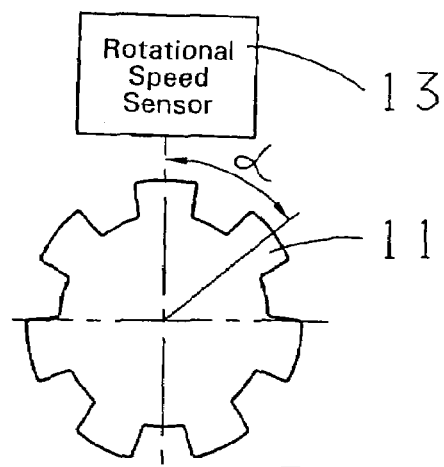
Fig. 1
Fig. 2
Fig. 3

METHOD AND DEVICE FOR DETERMINING THE TORQUE ON GEAR SHAFTS

This application is a national stage completion of PCT/EP2004/010295 filed Sep. 15, 2004 which claims priority from German Application Serial No. 103 47 494.3 filed Oct. 13, 2003.

FIELD OF THE INVENTION

The invention concerns a method and a device for determining torque on gear shafts.

BACKGROUND OF THE INVENTION

It is well known among transmission experts that in order to optimize drive strategies and gear change operations of automated manual transmissions, the information of the current motor or gear input torque is needed. In practice, the current torque is measured by taking the crankshaft or gear input shaft rotational speeds as well as the accelerator pedal position into consideration, which allow the present torque on the crankshaft and/or on the gear input shaft to be determined with the help of a characteristic torque curve that is stored in an evaluation and control unit.

In case of retarders, i.e., wear free service brakes of the vehicle, according to the state of the art, their braking torque is determined as a function of the braking pressure and a characteristic curve which is also recorded in a control and regulating unit. Good regulation of the braking effect of retarders, however, is not quite possible based on such a measurement of the braking effect.

Starting from this state of the art, the object of the invention is to develop a method and a device with the help of which the change in input torque of a transmission or the braking torque on a retarder can be determined easily and quickly.

SUMMARY OF THE INVENTION

The invention is based on the knowledge that in the case of a constant gear transmission ratio and constant input torque, the rotational speed of a transmission input shaft and a transmission output shaft have a fixed ratio to each other. If this ratio changes, it indicates a change in the gear input torque in the case of a constant transmission ratio. This changed value could be used to determine the transmission input torque.

Having knowledge of this context, an innovative method has been suggested in which for a constant transmission ratio the rotational speeds of a first gear shaft and a second gear shaft can be cyclically measured, wherein a first torque is present at the first gear shaft and a second torque is present at the second gear shaft and the second gear shaft is driven by the first gear shaft directly or indirectly through gears. In addition, a quotient is derived from these two rotational speeds and is subsequently recorded so that the current quotient can be compared to the previous quotient measured and a difference in the value between the current measurement and the previous measurement can indicate a change in the torque of the first gear shaft.

This changed value alone could be used for controlling and regulating the transmission ratio changing operations in a transmission. According to a preferred embodiment of the invention, it is provided that the input torque in the transmission be determined from the difference in the quotients.

In another embodiment of the invention, it is provided that the rotational speeds of both gear shafts are determined with the help of sensors, which generate electric impulses as a function of the rotational speed. From the measured electric impulses of the rotational speed sensors on both gear shafts, in the case of a constant transmission ratio, a phase or angle shift of the impulses can be determined from a change in torque, which shift is proportional to the transmitted torque and to the elasticity of the components transmitting the torque, and also be evaluated as a characteristic for the input torque.

Although this method is preferably used to determine the torque of a combustion engine, even other applications in transmissions could be meaningful. The braking torque of a retarder could be similarly determined, and this value could be used for controlling and regulating the same.

If the torque of a drive unit, such as a combustion engine, for example, needs to be determined, the inventive device offers the possibility of utilizing the rotational speed of the drive motor or the gear input shaft (first gear shaft) as well as the rotational speed of a gear drive shaft (second gear shaft) for determining the described torque or change in torque.

If the braking torque of a retarder needs to be determined, the rotational speeds of two gear shafts associated with a retarder are measured in a similar way.

In addition, the above method can be used to determine the traction torque and shearing torque in a transmission.

Finally, it should be pointed out that the inventive method can be used alone or together with one or more embodiments or further developments determining the torque in automatic or automated manual transmissions with or without a splitter drive.

A device for determining the torque on the gear shafts comprises an evaluation and control device, which captures and analyzes torque relevant measurement signals on the transmission with the help of sensors via sensor lines. It is provided that the evaluation and control device is connected to two rotational speed sensors, which are arranged on two gear shafts, wherein a first torque is present at the first gear shaft and a second torque is present at the second gear shaft.

For the analysis of the captured measurements, the evaluation and control device comprises a computation area where a rotational speed quotient is determined from the captured rotational speed measurements of a measuring cycle. In addition, a data storage device is also provided for storing the rotational speed measurements and/or the rotational speed quotients. In addition, the evaluation and control device comprises an area for comparison, which allows a comparison of the quotient of the latest measuring cycle to the quotients of the previous measuring cycle. Apart from this, the evaluation and control device comprises a decision area in which the change in torque is determined on the basis of the quotient comparison.

Finally, it is considered advantageous to have a determination area in the evaluation and control device, in which area the first torque present on the one gear shaft (input torque) can be determined from the change in the torque.

On the basis of the determined information, the evaluation and control device can finally trigger control orders for executing the gear ratio change operation in the transmission.

BRIEF DESCRIPTION OF THE DRAWINGS

The invention will now be described, by way of example, with reference to the accompanying drawings in which:

FIG. 1 is a countershaft transmission with a measuring system for determining the gear input torque;

FIG. 2 is a sensor gear for a rotational speed sensor at the gear input shaft;

FIG. 3 is a sensor gear for a rotational speed sensor at the gear output shaft;

DETAILED DESCRIPTION OF THE INVENTION

Figure 4:
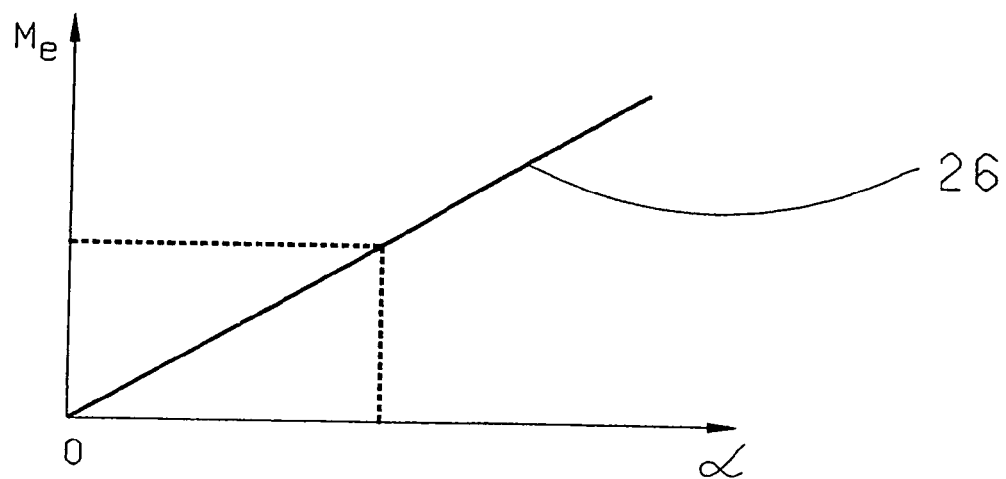
FIG. 4 is a diagram illustrating the dependence of an input torque Me from a phase or angle shift α.

According to this, the method can be used in a countershaft transmission 1 of the type shown in FIG. 1, in which a gear input shaft 2 and a gear output shaft 3 are disposed co-axially to each other in a transmission housing. Axially parallel to both these shafts, a lay shaft 4 is disposed in the transmission, a drive gear 6 of which can be driven by an output gear 5 on the gear input shaft 2.

In addition, rigid gears 7 are arranged on the lay shaft 4, which mesh with idler gears 8 for implementing specific forward gear transmission ratios. The idler gears 8 are arranged on the gear output shaft 3 and can rotate on the shaft. For the purpose of alternately slowing down and non-rotatably connecting the idler gears 8 with the gear output shaft 3, synchronization and coupling devices 9 arranged on the output shaft, which are mounted axially displaceably and non-rotatably.

For the determination of a change in the input torque present on the gear input shaft 2, a device is arranged on the transmission 1, which is associated with an evaluation and control device 14 which, in the simplest case, is identical to the control and regulating device of the transmission. This evaluation and control device 14 is connected to rotational speed sensors 12, 13 via sensor lines 15, 16 as well as via control lines 17 to actuators, which are not shown here. The latter alternately actuate sliding sleeves of the synchronization and coupling devices 9, in the known fashion, which sleeves can be axially displaced on the gear output shaft 3, but are mounted non-rotatably.

As shown in FIGS. 2 and 3, the rotational speed sensors 12, 13 work in conjunction with rotational speed sensing gears 10, 11, which are mounted non-rotably on the gear input shaft 2 and gear output shaft 3, respectively. The teeth of these rotational speed sensing gears 10, 11 generate the same electric impulses on passing the sensors 12, 13, which are fed to the evaluation and control device 14 as described.

In the case of constant gear ratios, the rotational speed of the input gear shaft 2 and the rotational speed of the gear output shaft 3 have a constant ratio with respect to each other. This ratio (the quotient of the gear input shaft rotational speed and the gear output shaft rotational speed) is determined by the evaluation and control device 14 and stored. Subsequently, the rotational speed of the gear input shaft 2 and that of the gear output shaft 3 are determined in a next measuring cycle, and a second quotient is determined from these values. If a deviation is found between the current quotient and the previous quotient during the subsequent comparison, it would imply that the gear input torque has changed.

Since in the case of manual transmissions, the gear input shaft is generally connected to the output shaft of a driving motor, for example to the crankshaft, of a combustion engine without influencing the torque to be transmitted. The determined change in the input torque can be interpreted as a change in the torque of the combustion engine.

This change of the input torque is reflected in the measurement signal course of the sensors 12, 13 at the gear shafts 2, 3, as shown in the FIGS. 2 and 3, in that a phase or an angle shift a of the measured signals can be determined, which is proportional to the torque transmitted by the gearbox and also dependent on the elasticity of the transmission components transmitting the torque.

With the knowledge of a starting torque for the described measurements and with the help of the phase or the angle shift a and/or the quotient comparison obtained as described earlier, the change in the input torque and the current input torque Me can be computed. This is explained in FIG. 4 by way of example with the help of a characteristic curve 26.

Figure 5:
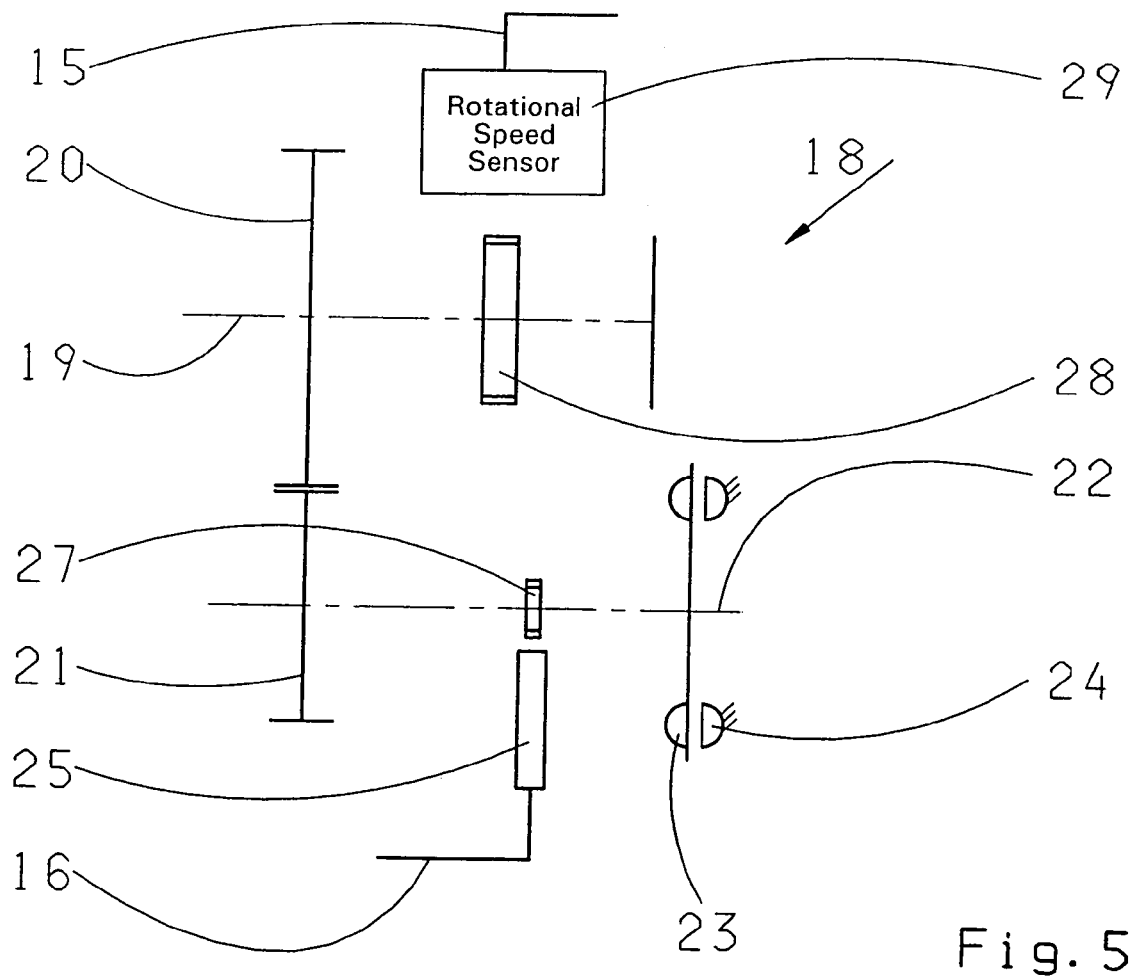
FIG. 5 is a secondary retarder with two rotational speed sensors.

Apart from determining the engine torque or the transmission input torque, the above method and the associated device enable the determination of the current braking torque of a retarder. Such a retarder 18 is illustrated schematically by way of example in FIG. 5, being a so-called secondary retarder in this case.

In the case of this retarder 18, a gear output shaft 19 carries a rigid gear 20, which meshes with a rigid gear 21 on a retarder shaft 22. The latter shaft 22 carries a rotor 23 of a hydrodynamic braking device in the known manner, which device works together with an associated stator 24 from a fluidic point of view.

For the determination of the braking moment generated by the retarder 18, rotational speed sensor gears 27, 28 are attached to the transmission output shaft 19 and the retarder shaft 22, which work together with rotational speed sensors 25, 29. These rotational speed sensors 25, 29, as is shown in FIG. 1, are connected to the evaluation and control device 14 through sensor lines 15, 16. The analysis of the measurements of the rotational speed sensors 25, 29 is carried out in this device.

With the help of such a design, it is possible to determine the braking effect on the transmission output shaft 19 with the help of the retarder 18 and use it for controlling the braking power. This is carried out through targeted filling of the oil space between the rotor 23 and the stator 24 of the retarder 18.

REFERENCE NUMERALS 1 countershaft transmission
2 gear input shaft
3 gear output shaft
4 lay shaft
5 output gear
6 drive gear
7 rigid gear
8 idler gear
9 synchronization and coupling means
10 rotational speed sensor gear
11 rotational speed sensor gear
12 rotational speed sensor
13 rotational speed sensor
14 evaluation and control device
15 sensor line
16 sensor line
17 control line
18 secondary retarder
19 transmission output shaft
20 rigid gear on the transmission output shaft
21 rigid gear on the retarder shaft
22 retarder shaft 23 rotor of the retarder
24 stator of the retarder
25 rotational speed sensor on the retarder shaft
26 function curve Me=f(α)
27 rotational speed sensor gear
28 rotational speed sensor gear
29 rotational speed sensor
Me input torque
α phase or angle change

The invention claimed is:

1. A method for determining the torque on transmission shafts, the method comprising the steps of:
   cyclically measuring a rotational speed of a first gear shaft (2, 19) and a rotational speed of a second gear shaft (3, 22) of transmission with a constant transmission ratio, a first torque being present on the first gear shaft (2, 19) and a second torque being present on the second gear shaft (3, 22), and the second gear shaft (3, 22) being driven one of directly and indirectly by the first gear shaft (2, 19) via at least a two gears (5, 6, 7, 8; 20, 21);
   computing a value from the rotational speed of the first gear shaft (2, 19) and the rotational speed of the second gear shaft (3, 22) and storing the computed value;
   comparing a current value with a value of a previous value;
   deriving a change in the torque of the first gear shaft (2, 19) by a difference between the current value and the previous value;
   determining the rotational speeds of the two gear shafts (2, 3; 19, 22) by rotational speed sensors (12, 13; 25, 29), which generate speed-related electrical impulses; and
   determining one of a phase or angle shift (α) from measured electric impulses of the rotational speed sensors (12, 13; 25, 29) on the two gear shafts (2, 3; 19, 22), which is proportional to transmitted torque and to elasticity of torque-transmitting components of the transmission and is also a characteristic of input torque.

2. The method according to claim 1, further comprising the step of measuring rotational speeds of one of a driving motor, a gear input shaft (2) and a rotational speed of a gear output shaft (3).

3. The method according to claim 2, further comprising the step of determining a torque of a combustion engine.

4. The method according to claim 1, further comprising the step of using a quotient from the two rotational speeds as the value computed from the two rotational speeds.

5. The method according to claim 1, further comprising the step of determining one of a traction and a shearing torque in the transmission.

6. The method according to claim 1, further comprising the step of using the quotient for determining torque in one of an automatic or automated manual transmission with at least one splitter drive.

7. The method according to claim 1, further comprising the step of using the quotient for determining torque in one of an automatic or automated manual transmission without any splitter drive.

8. A method for determining the torque on transmission shafts, the method comprising the steps of:
   cyclically measuring a rotational speed of a first gear shaft (2, 19) and a rotational speed of a second gear shaft (3, 22) in a transmission with a constant transmission ratio, a first torque being present on the first gear shaft (2, 19) and a second torque being present on the second gear shaft (3, 22), and the second gear shaft (3, 22) being driven one of directly and indirectly by the first gear shaft (2, 19) via at least two gears (5, 6, 7, 8; 20, 21);
   computing a value from the rotational speed of the first gear shaft (2, 19) and the rotational speed of the second gear shaft (3, 22) and storing the computed value;
   comparing a current value with a value of a previous value;
   deriving a change in the torque of the first gear shaft (2, 19) by a difference between the current value and the previous value;
   determining the rotational speeds of the two gear shafts (2, 3; 19, 22) via rotational speed sensors (12, 13; 25, 29), which generate speed-related electrical impulses; and
   measuring rotational speeds of two shafts (19, 22) associated with a retarder (18) and determining a braking torque of a retarder (18).

* * * * *